United States Patent [19]

Reichow

[11] Patent Number: 4,969,529
[45] Date of Patent: * Nov. 13, 1990

[54] VEHICLE ON-BOARD TRANSDUCER FOR USE WITH DUAL AXLE EQUALIZER HANGER SYSTEMS

[76] Inventor: Keith W. Reichow, 19237 124th Ave. S.E., Renton, Wash. 98058

[*] Notice: The portion of the term of this patent subsequent to Dec. 5, 2006 has been disclaimed.

[21] Appl. No.: 426,327

[22] Filed: Oct. 24, 1989

Related U.S. Application Data

[63] Continuation of Ser. No. 329,773, Mar. 28, 1989, Pat. No. 4,884,644.

[51] Int. Cl.$^5$ ............... G01G 19/08; G01G 3/14
[52] U.S. Cl. ................... 177/137; 177/210 R
[58] Field of Search ................ 177/136–138, 177/210 R

[56] References Cited

U.S. PATENT DOCUMENTS

| | | | |
|---|---|---|---|
| 2,181,277 | 11/1939 | Labbe | 177/138 |
| 4,042,049 | 8/1977 | Reichow et al. | 177/137 |
| 4,789,033 | 12/1988 | Dohrman | 177/137 |
| 4,884,644 | 12/1989 | Reichow | 177/137 |

Primary Examiner—George H. Miller, Jr.

[57] ABSTRACT

An on-board system for measuring vehicle loads on dual axles with a suspension system having a front hanger, a rear hanger, an equalizer and an equalizer hanger. Attached to the equalizer, in one embodiment, are a plurality of strain gauges, arranged in two cut-out portions. The strain gauges are positioned so that the measured strain corresponds to the force of the vertical load on the equalizer. The output of the strain gauges is then applied to a conventional bridge circuit and from there to a conventional electronic circuit to provide a display which indicates the weight of the load on the dual wheels.

13 Claims, 3 Drawing Sheets

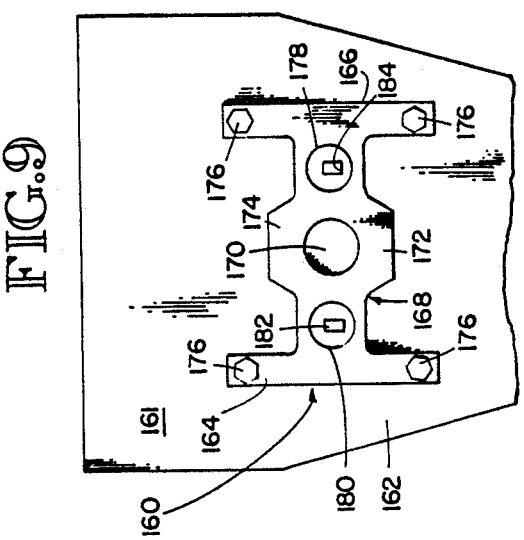
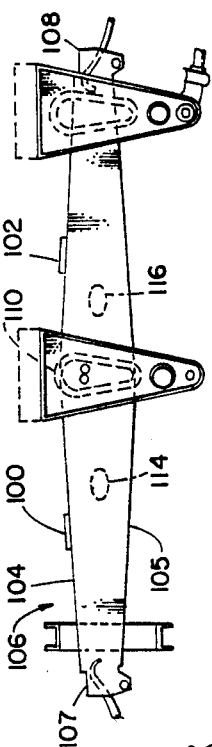
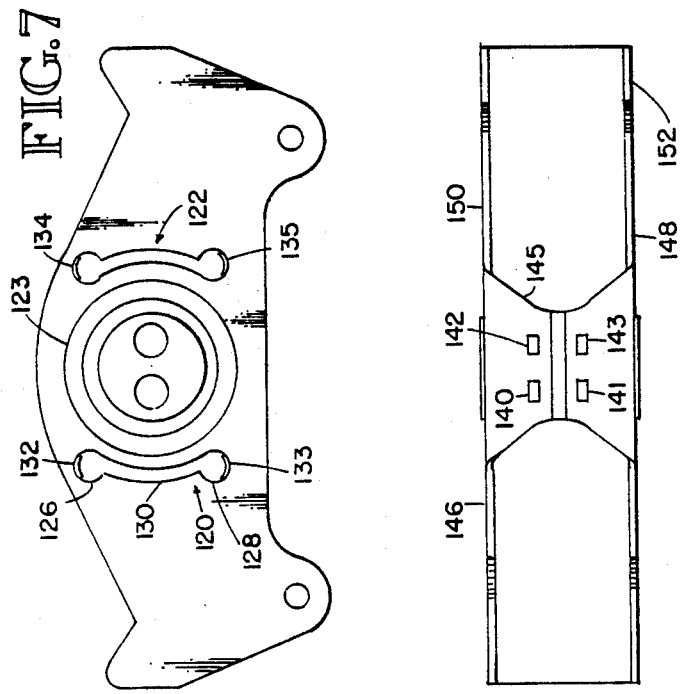

VEHICLE ON-BOARD TRANSDUCER FOR USE WITH DUAL AXLE EQUALIZER HANGER SYSTEMS

This is a continuation of application Ser. No. 329,773, filed on Mar. 28, 1989.

TECHNICAL FIELD

This invention relates generally to the art of vehicle weighing systems, and more particularly concerns on-board weighing systems for use on vehicles with dual axles having a load-equalizing suspension system.

BACKGROUND ART

There is currently a significant need for accurate on-board weighing systems for certain vehicles like tractor-trailer combinations which have dual axles. The weighing of tractor-trailer loads, for instance, is now typically done at roadside weighing stations. The weighing process may take considerable time and large fines may be levied if the vehicle is significantly overweight, even unknowingly. An accurate vehicle on-board weighing system would reduce significantly the uncertainty of the actual weight of the vehicle load and thus reduce or eliminate fines due to overweight loads. The vehicle may also be confidently loaded close to the legal limit with the aid of an on-board system. Further, a continuing accurate knowledge of load weight is attained by use of an accurate on-board system.

As mentioned above, however, most tractor-trailer vehicles do not have an on-board weighing system, primarily because the use of an on-board weighing system for such vehicles has heretofore required rather elaborate modifications to the vehicle. In such an on-board system, load cells are typically installed between a portion of the suspension system of the vehicle and the frame. However, in order not to increase the overall height of the vehicle, i.e. the trailer of a tractor-trailer combination, a portion of the frame must be cut out and the load cell welded in place. A portion of the load-equalizing part of the suspension system, i.e. the equalizer hanger, is fixed to the load cell and the equalizer box itself is then attached to the hanger.

Obviously, such modifications to new vehicles are costly and retrofitting an existing vehicle is even more expensive. Replacement of welded-in load cells is of course quite difficult and expensive as well. Also, there are frequently problems with the accuracy of such devices, due to horizontal loads on the load cell caused by the particular physical arrangement of the load cell relative to the trailer.

The present invention incorporates a completely different structural approach to the use of load cells on such vehicles in order to produce accurate, reliable load measurements. The present invention also requires no modification to the frame of the vehicle.

DISCLOSURE OF THE INVENTION

Accordingly, the invention includes an equalizer structure which forms part of the suspension system of a vehicle, the suspension system equalizing the load between the dual axles of the vehicle, wherein the equalizer structure includes front and rear hanger elements, an intermediate load equalizer which is connected to the front and rear hanger elements by another portion of the vehicle suspension system and an equalizer hanger connected to the intermediate load equalizer such that a portion of the vertical load on the dual axles acts through at least one of (1) the equalizer and (2) the equalizer hanger. Transducer means are mounted at selected locations on one of either the equalizer or the equalizer hanger in such a manner and arrangement that an output signal is produced which is an accurate indication of the total vertical load on the dual axles.

BRIEF DESCRIPTION OF THE DRAWINGS

FIG. 6 is a side elevational view of another embodiment of the vehicle on-board weighing system of the present invention.

FIG. 7 is a side elevational view of a still further embodiment of the vehicle on-board weighing system of the present invention.

FIG. 8 is a bottom plan view of the embodiment of FIG. 7.

FIG. 9 is a side elevational view of yet another embodiment of the vehicle on-board weighing system of the present invention.

BEST MODE FOR CARRYING OUT THE INVENTION

Figure 1:
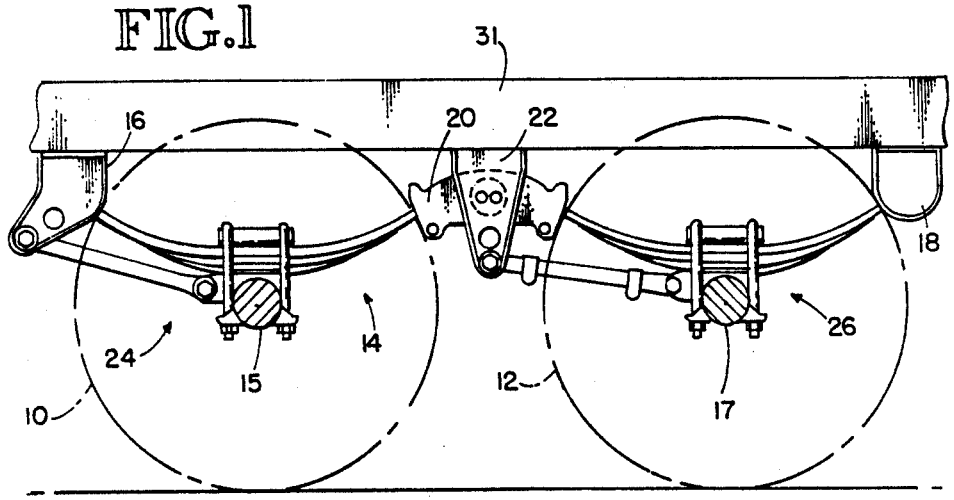
FIG. 1 is an isometric view showing a conventional vehicle (tractor-trailer) suspension system with an equalizer box for equally distributing the vehicle load between the dual axles.

As discussed briefly above, a vehicle on-board weighing system for tractor-trailer combinations which does not require extensive modifications to the vehicle frame and which can be conveniently retrofitted to existing vehicles, is quite desirable. Referring to FIG. 1, a conventional tractor-trailer vehicle is shown to include a plurality of dual axles. The wheels of one set of dual axles is shown in phantom at 10 and 12. The dual axles could be positioned at the front of the trailer adjacent the tractor portion of the combination, or at the rear of the trailer, or in some cases at both positions.

Between each set of dual axles is a conventional suspension system shown generally at 14. The suspension system 14 includes a load equalizing system for distributing the load substantially equally between the two axles 15 and 17. The load equalizing system includes a front hanger 16, a rear hanger 18, an equalizer 20 and an equalizer hanger 22. Spring assemblies 24 and 26 extend, respectively, between the equalizer 20 and the front and rear hangers 16 and 18.

The conventional suspension system 14, including the load equalizing system shown in FIG. 1 and described above, is well known in the art and is commercially available from several manufacturers. In the conventional spring suspension, the front and rear hangers and the equalizer hanger 22 are mounted to the frame 31 of the trailer, such as by bolting or welding. In the adaption of the trailer to on-board weighing systems, typically a portion of the frame 31 is cut out and a transducer is welded into place between the truck frame 31 and the equalizer hanger 22. As indicated above, such a procedure is expensive, and it is particularly difficult to retrofit existing trailers to accommodate such a system. Accordingly, as noted above, on-board weighing systems are infrequently used on such vehicles, even though there are substantial benefits to be gained with an on-board weighing system.

Figure 3:
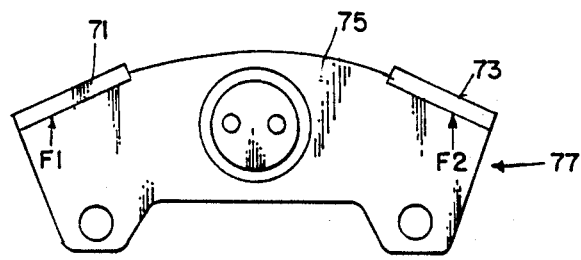
FIG. 3 is an elevational view of another embodiment of the vehicle on-board weighing system of the present invention.
Figure 2:
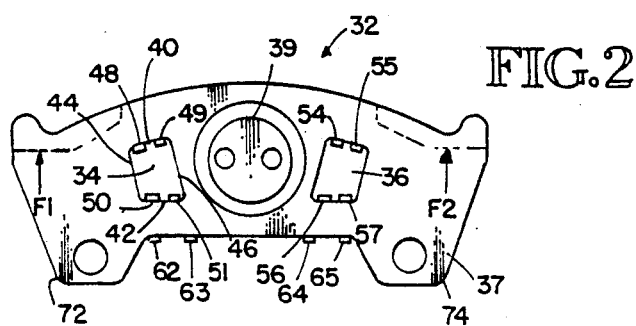
FIG. 2 is an elevational view showing first and second embodiments of the vehicle on-board weighing system of the present invention.

In the present invention, the configuration of the load-equalizing system remains substantially the same and its conventional attachment to the vehicle frame remains unaffected. FIGS. 2 and 3 show two different but related embodiments of an on-board weighing system incorporating the principles of the present invention. In FIG. 2, the equalizer portion 32 of the load-equalizing system (front/rear hangers, equalizer and equalizer hanger) is structurally modified to the extent of cutting out two openings 34, 36 through the front plate portion 37 of the equalizer, on opposite sides of rocker bearing 39.

The two openings or cut-out portions 34 and 36 are somewhat irregular in shape, but are substantially identical, with opening 34 being exemplary. The top and bottom edges 40 and 42, respectively, of the opening 34 are approximately parallel with the adjacent edge surfaces of the equalizer 32, while side edges 44 and 46 of opening 34 extend between the top and bottom edges 40 and 42 at approximately right angles to the top edge 40. Thus, inner side edge 46 in the embodiment shown is somewhat longer than outer side edge 44. It should be understood, however, that openings 34 and 36 may assume various sizes and configurations within the spirit of the present invention.

Strain gauges 48–51 are attached to the top and bottom edges 40 and 42 of opening 34, while strain gauges 54–57 are attached to the top and bottom edges of opening 36. Strain gauges 48, 49, 54 and 55 on the top edges of the two openings 34, 36 form one gauge group, while gauges 50, 51, 56 and 57 on the opposing bottom edges of the two openings form a second gauge group. The strain gauges used in the embodiment shown are conventional and are commercially available from several manufacturers.

The transducers comprising the above groups of gauges, respectively, are connected together into a conventional bridge circuit. Each group of gauges includes a total strain which corresponds to the sum of the forces acting at F1 and F2 in FIG. 2. The output of the bridge circuit is then applied to a conventional electronics circuit, including a display, which will provide an actual load in pounds. In the embodiment shown, either the first or second group of gauges may be used alone, or they may be used together.

FIG. 2 also shows an alternative embodiment using the equalizer 32, in which conventional strain gauges 62, 63, 64 and 65 are positioned on the lower surface 68 thereof. Gauges 62 and 63 are positioned relatively toward one end 72 of the equalizer, while gauges 64 and 65 are positioned relatively toward the other end 74. The gauges 62–65 are connected together in a bridge circuit, the output of which corresponds to the sum of the forces at F1 and F2. The output of the bridge circuit is then applied to an electronic circuit which produces an output indicating the weight of the load on the wheels connected to the equalizer 32.

FIG. 3 shows a further embodiment of the present invention. In FIG. 3, force transducers 71 and 73 are secured to the top surface 75 of equalizer 77, in the vicinity of the opposite ends thereof, as shown. Transducers 71 and 73 in the embodiment shown measure the force of the vehicle springs (not shown) which bear directly on them. The output of the transducers 71 and 73 is applied to a conventional electronic circuit to produce an output signal which corresponds to forces F1 and F2 in FIG. 3.

Figure 4:
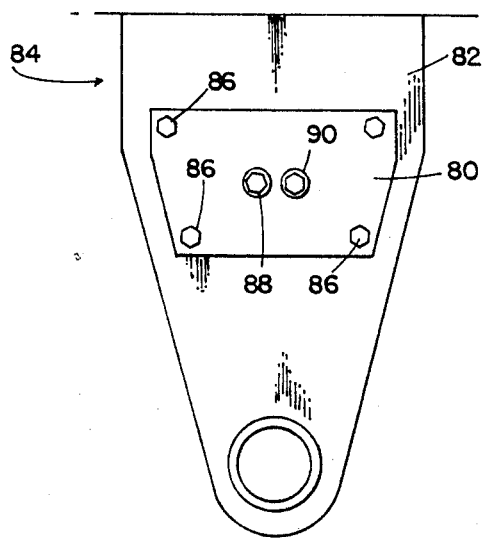
FIG. 4 is an elevational view showing yet another embodiment of the vehicle on-board weighing system of the invention.

In another embodiment shown in FIG. 4, a flat plate type transducer 80 is secured directly to one or both faces 82 of the equalizer hanger portion 84 of the suspension system. The transducer 80 is secured to the face 82 of the hanger 84 by bolts 86 at the four corners thereof. The transducer 80 supports pins 88 and 90 approximately centrally thereof. The pins 88 and 90 extend through the equalizer hanger 84 and support the equalizer, as shown in FIG. 1.

The pins 88 and 90 thus in effect carry or support the vertical load from the equalizer, and the force on transducer 80 is representative of the vertical load which is to be measured. The output of the transducer 80 is again, as with previous embodiments, applied to a conventional electronic circuit which provides an indication of the actual load weight.

Figure 5:
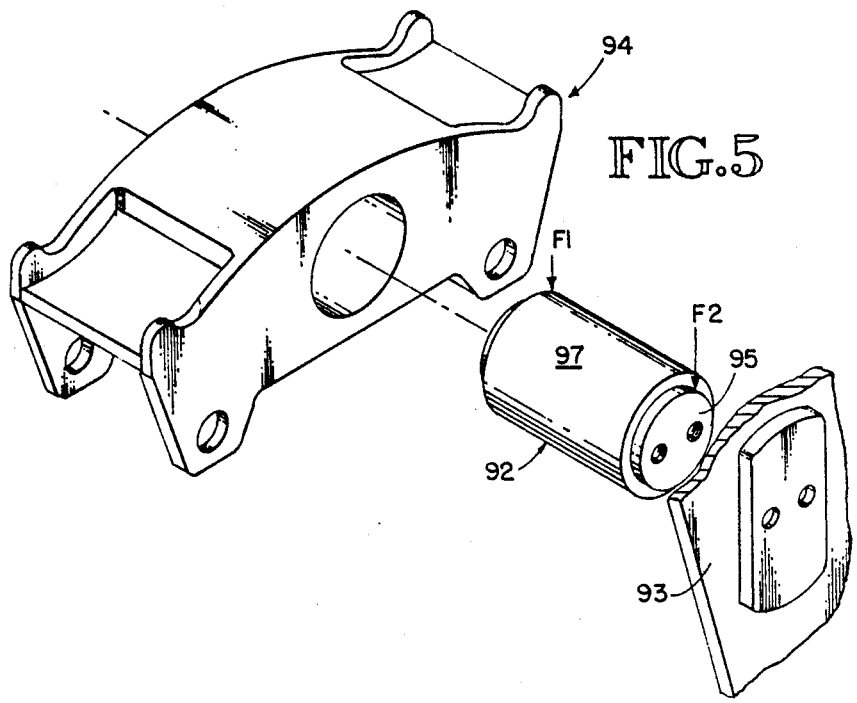
FIG. 5 is an isometric, partially exploded view showing a still further embodiment of the vehicle on-board weighing system of the present invention.

FIG. 5 shows a still further embodiment of the present invention. In this embodiment, the cross pin or rocker bearing portion 92 of the equalizer portion 94 of the suspension system (FIG. 1) is a transducer. This type of transducer is referred to as a shear pin load cell. One end surface, i.e. surface 95 for example, of transducer 92 is adjacent the inside surface of the equalizer hanger portion 93 of the suspension system. The vertical loads on the equalizer 94 go into surface 97 of the pin 92. The transducer in effect measures the forces F1 and F2. The signal from the transducer is provided to a conventional electronic circuit which provides a display indicative of the vertical load on the two wheels associated with the suspension system of which equalizer 94 is a part.

FIG. 6 shows another embodiment of the present invention for use on a suspension system in which the dual axles are spaced farther apart than normal, requiring the use of an extended, i.e. longer, equalizer. In this embodiment, deflection transducers 100, 102 are mounted along the top edge 104 of the extended equalizer 106, at points, respectively, approximately midway between the respective ends 107 and 108 of the extended equalizer 106 and the center 110 thereof.

Although it is preferable that the transducers 100, 102 be positioned on the top edge 104, it is also possible that the deflection transducers could be positioned on the front of the equalizer, as shown in dotted lines, 114, 116, located approximately midway between the top and bottom edges of the extended equalizer 106. The transducers, i.e. transducers 100, 102 or transducers 114, 116, are connected to a conventional electronic circuit, the output of which provides the weight of the load on the dual axles.

FIG. 7 shows a still further embodiment of the equalizing system which is somewhat similar to FIG. 2 in that it includes cutout portions 120, 122 in the front plate of an equalizer 124, on opposite sides of the rocker bearing 123. Each opening 120 and 122 is somewhat in the shape of a dumb bell, with a relatively small curvature, having end portions 126, 128 (opening 120) which are somewhat circular or oval, joined by a narrow center section 130, the center section 130 being slightly curved in accordance with the curvature of the rocket bearing 123.

In one embodiment, strain gauges 132, 133, 134, 135 are positioned on the edges of the cutout portions 120, 122 at the very top and bottom thereof, as shown. Strain gauges 132 and 133 are positioned at the top and bottom, respectively, of cutout portion 120, while strain gauges 134, 135 are positioned at the top and bottom of cutout portion 122.

Alternatively, in the same embodiment, strain gauges 140, 141, 142, 143 can be positioned on the bottom bridge element 145 (FIG. 8) which connects the front and back plate portions 146, 148 of the equalizer.

In still another related embodiment, strain gauges could be mounted in pairs on the radiused lower edges (both front and rear such as edges 150, 152 in FIG. 8) of the front and back plates of the equalizer. A gauge shield could be used to cover the gauges, extending across the equalizer between the front and back plates. An electrical connector could be mounted on the upper edges of the equalizer, with electrical connections to the gauges which would be located to either side of the rocker bearing element, at points of maximum strain.

FIG. 9 shows a still further embodiment of the present invention. In this embodiment, a flat plate transducer shown generally at 160 is secured to the front surface 161 of an equalizer hanger 162. A substantially identical transducer could be secured to the rear surface (not shown) of the equalizer hanger. The embodiment is operable using one or two transducers.

Transducer 160 is generally in the form of an H, comprising two vertical legs 164 and 166 separated by a connecting section 168. In connecting section 168 is a circular opening 170 through which extends the rocker bearing (not shown in FIG. 9). In the embodiment shown, the transducer is approximately ¼ inch thick. The connecting section 168 includes extending central portions 172 and 174, which extend outwardly from the remainder of the connecting section 168, generally in the form of a truncated triangle. The transducer 160 is mounted to the equalizer hanger 162 by means of bolts 176-176. Alternatively, the transducer could be welded to the equalizer hanger.

Located in the connecting section 168 on both sides of opening 170 are flat bottomed holes 178 and 180. In the embodiment shown, these holes are 1 inch in diameter and approximately ¼ inch deep. The holes 178 and 180 are located in the areas of maximum shear strain for the transducer; these areas being referred to as sensing sections. The sensing sections could alternatively be located and configured to measure bending instead of shear. Mounted on the bottoms of the holes 178, 180 are conventional strain gauges 182 and 184. These strain gauges are connected in a conventional bridge arrangement as discussed in connection with other embodiments to provide an indication of actual vehicle load.

All of the above embodiments share the common feature of strain gauges, or other conventional transducing elements, such as inductive or optical displacement measuring devices, positioned in some fashion on a portion of the vehicle suspension system, in particular the equalizer or the equalizer hanger portions of a dual axle suspension system. The strain gauges are selected and positioned as shown in several different embodiments, in order to provide a signal which is representative of the actual vertical load on the dual axles. The output of the gauges is then applied to a bridge circuit, if appropriate, and from there to a conventional electronic circuit and a display which produces a readout of the actual weight load on the wheels.

The advantage of such a system is that it is relatively inexpensive, and may be easily retrofitted to an existing vehicle. It requires no extensive modification to the existing frame of a vehicle such as the trailer portion of a tractor-trailer combination. As a result, on-board weighing systems for truck-trailer combinations may be implemented in a practical fashion, either for new tractor-trailer combinations or as a retrofit.

Although a preferred embodiment of the invention as well as alternative embodiments have been disclosed herein for purposes of illustration, it should be understood that various changes, modifications and substitutions may be incorporated in such embodiments without departing from the spirit of the invention as defined by the claims which follow.

I claim:

1. An on-board weighing system for vehicles with dual axles, comprising:
    an equalizer structure connected to the frame of the vehicle and forming part of the suspension system of the vehicle for equalizing the load between the dual axles thereof, the equalizer structure comprising front and rear hanger elements, an intermediate load equalizer connected to the front and rear hanger elements by another portion of the vehicle suspension system and an equalizer hanger connected to the intermediate load equalizer, such that a portion of the vertical load on the dual axles acts through at least one of (1) the equalizer, and (2) the equalizer hanger; and
    transducer means mounted at selected locations on one of (1) the equalizer and (2) the equalizer hanger, but not connected directly to the frame of the vehicle, in such a manner as to provide an output signal, in response to a load on the dual axles, which is an accurate indication of the total vertical load on the dual axles.

2. A system of claim 1, wherein the transducer means are located so that the force thereon corresponds to substantially only the vertical force created by the load on the wheels.

3. A system of claim 1, wherein the system is characterized by a lack of any modification of the frame of the vehicle.

4. A system of claim 1, wherein the system is characterized by a lack of any height increase of the vehicle.

5. A system of claim 1, including means responsive to said output signal from said transducer means to produce an electrical signal representative of the weight of the vehicle load and means responsive to said electrical signal for displaying said weight.

6. A system of claim 1, wherein the transducer means are strain gauges positioned in cut-out portions of the equalizer.

7. A system of claim 6, including two cut-out portions, wherein the strain gauges are positioned about the periphery of both of said cut-out portions.

8. A system of claim 1, wherein the transducing means include strain gauges which are positioned on the lower edge of said equalizer.

9. A system of claim 1, wherein said transducing means includes force transducers which are mounted on the upper edge of said equalizer in the vicinity of the opposing ends thereof.

10. A system of claim 1, wherein the equalizer hanger includes a facing surface, wherein the system includes a force transducer secured to the facing surface of the equalizer hanger, said force transducer including at least one support pin which extends therethrough, and wherein the equalizer hanger is secured to the equalizer by said support pin, so that the force of the vertical load on the equalizer is also on the force transducer.

11. A system of claim 1, wherein the equalizer includes a rocker bearing which extends approximately through the middle thereof, said rocker bearing including means therein to permit connection between the equalizer and the equalizer hanger, wherein the rocker bearing is a transducer arranged so to measure the force of the vertical load on the equalizer.

12. A system of claim 1, wherein the equalizer hanger includes a facing surface, wherein the system includes a transducer secured to the facing surface of the equalizer hanger, said force transducer being generally in the form of an H comprising two vertical leg portions and a joining horizontal intermediate portion, wherein the equalizer includes a rocker bearing which extends through the intermediate portion, and wherein the transducer includes strain gauges located in said intermediate portion, on opposite sides of said rocker bearing.

13. A system of claim 12, wherein said strain gauges are located on said transducer in areas of maximum strain.

* * * * *